United States Patent [19]

Nosler

[11] Patent Number: 4,978,174

[45] Date of Patent: Dec. 18, 1990

[54] LOW-WEIGHT, LOW-AERODYNAMIC-DRAG DISK WHEEL COVER

[76] Inventor: John C. Nosler, 2587 Floral Hill Dr., Eugene, Oreg. 97403

[21] Appl. No.: 416,272

[22] Filed: Sep. 29, 1989

[51] Int. Cl.[5] ............................................. B60B 7/02
[52] U.S. Cl. ................................. 301/37 R; 301/37 P
[58] Field of Search ............... 301/37 R, 37 SA, 37 P, 301/37 ST

[56] References Cited

U.S. PATENT DOCUMENTS

| | | | |
|---|---|---|---|
| 1,481,363 | 1/1924 | Hall | 301/37 SA X |
| 3,004,798 | 10/1961 | Tylle | 301/37 P |
| 4,360,213 | 11/1982 | Rudwick et al. | |
| 4,620,749 | 11/1986 | McEachern | |
| 4,660,893 | 4/1987 | Huntzinger | 301/37 P X |
| 4,682,821 | 7/1987 | Strazis | |
| 4,712,838 | 12/1987 | Berg et al. | 301/37 SA |
| 4,729,604 | 3/1988 | Dietz | 301/37 SA X |
| 4,792,191 | 12/1988 | Farmer | |
| 4,836,615 | 6/1989 | Berg et al. | |

FOREIGN PATENT DOCUMENTS

| | | | |
|---|---|---|---|
| 2096068 | 10/1982 | United Kingdom | 301/37 R |
| 8700802 | 2/1987 | World Int. Prop. O. | 301/37 SA |

Primary Examiner—Russell D. Stormer
Attorney, Agent, or Firm—Kolisch, Hartwell & Dickinson

[57] ABSTRACT

A light-weight, low-aerodynamic-drag disk bicycle wheel is disclosed wherein, bonded to the wheel's tire-carrying rim is a thin, light-weight, aerodynamic drag-reducing structure in the form of a heat-strunk plastic film protected against tearing by an inner, adhered, rip-stop backing fabric.

8 Claims, 2 Drawing Sheets

LOW-WEIGHT, LOW-AERODYNAMIC-DRAG DISK WHEEL COVER

BACKGROUND AND SUMMARY OF THE INVENTION

This invention relates to the field of aerodynamic wheels such as those which are often used today on racing bicycles. In particular, it relates to a unique aerodynamic wheel structure which is characterized by especially low weight and low cost.

In recent years, bicycle enthusiasts, racers, etc. have begun to incorporate so-called disk wheels with their bicycles. A typical disk wheel may or may not include the usual spoke structure between the hub and the rim, over which, or in place of which, there is formed a smooth-surfaced outer disk which defines the outside, opposite axial faces of a wheel. Such a structure has been shown to offer a decided reduction in aerodynamic drag in the direction that a bicycle travels.

However, current state of the art disk wheels do not come without a "high price tag". More specifically, currently available disk wheels can add many hundreds, and even several thousands of dollars of cost to a bicycle. In addition, they often add an appreciable amount of weight.

A general object of the present invention is to provide a unique aerodynamic wheel structure which can be produced and sold at, relatively, a very low cost, with the important added advantage of adding significantly lower weight to a wheel than that which is added by conventional disk structure.

According to a preferred embodiment of the invention, the proposed aerodynamic structure takes the form of a thin plastic film which overlies the usual spoke structure, and which is bonded to the rim. Strengthening this film against tearing is a rip-stop backing, preferably formed of a material such as a single layer of conventional cheese cloth.

The various features and advantages which are offered by this structure will become fully apparent as the description which now follows is read in conjunction with the accompanying drawings.

DETAILED DESCRIPTION OF THE INVENTION

Figure 1:
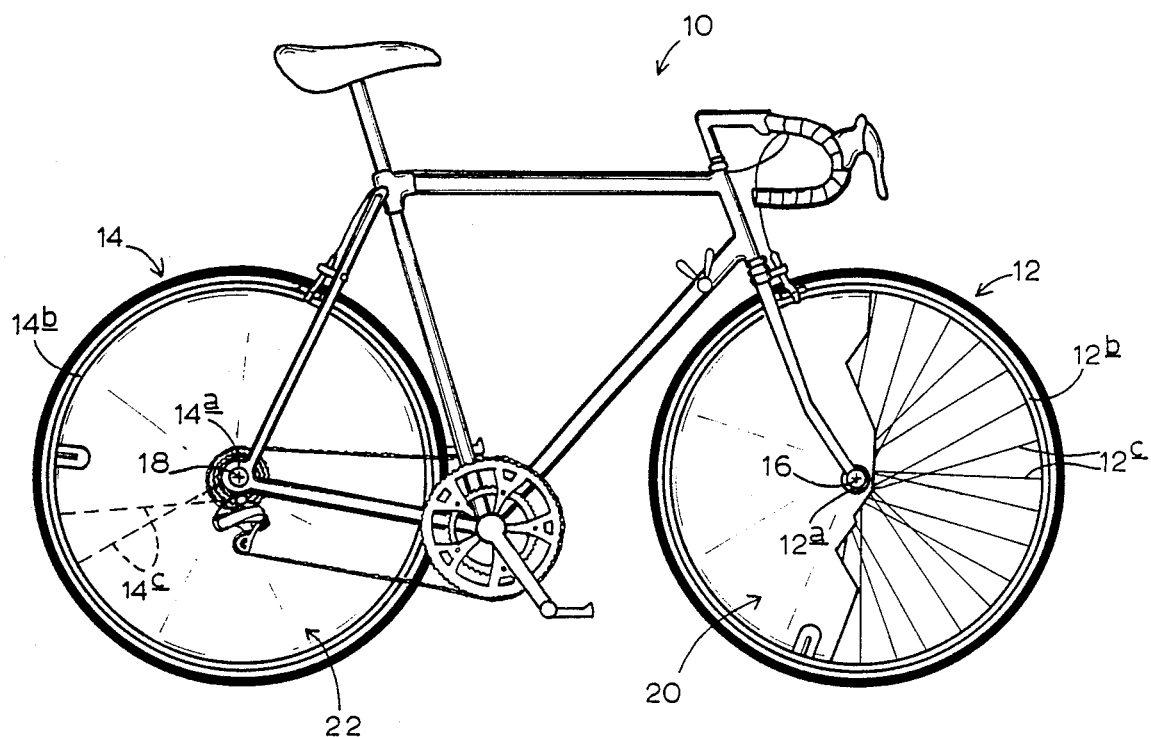
FIG. 1 is a side elevation of an otherwise conventional racing bicycle equipped with aerodynamic wheel structure constructed in accordance with the present invention.

Turning now to the drawings, and referring first to FIG. 1, indicated generally at 10 is a racing bicycle equipped with front and rear disk wheels 12, 14 which are constructed in accordance with the present invention. Wheels 12, 14 include central hubs 12a, 14a, outer tire-carrying rims, 12b, 14b, and spoke, or joinder, structure 12c, 14c. Wheels 12, 14 have rotation axes shown at 16, 18, respectively.

In addition, the front and rear wheels in bicycle 10 are constructed with drag reducing structures 20, 22 which are formed in accordance with the core features of the present invention.

Figure 2:
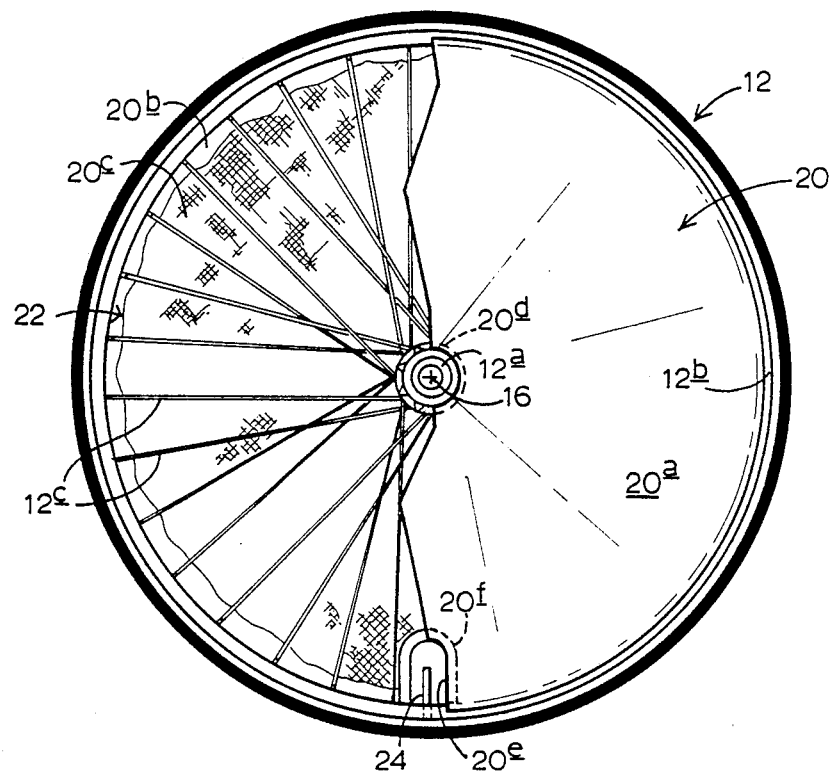
FIG. 2 is a side elevation of the front wheel of the bicycle shown in FIG. 1, removed from the bicycle, and with certain portions removed to reveal details of construction.

Considering FIG. 2 along with FIG. structure 20 includes a pair of annular plastic films, 20a, 20b formed preferably of a heat-shrinkable plastic material such as the material known as Mylar, backed on the inside by a single layer of cheese cloth, such as that shown at 20c, which, through suitable adhering to the films, acts as a rip-stop backing to prevent film tearing. The inside of each film is joined suitably to a supporting annular frame, such as that shown at 20d, and the outer perimeter of each film is suitably bonded as by gluing to a side in rim 20b. Formed at one location in each of structures 20, 22 is a generally U-shaped opening, such as that shown at 20e in FIG. 2 to provide clearance for the wheel's inflation valve shown at 24. These openings are supported on a suitable U-shaped frame such as that shown at 20f. The two frames mentioned are typically formed of a relatively light-weight wood, such as basswood.

Figure 3:
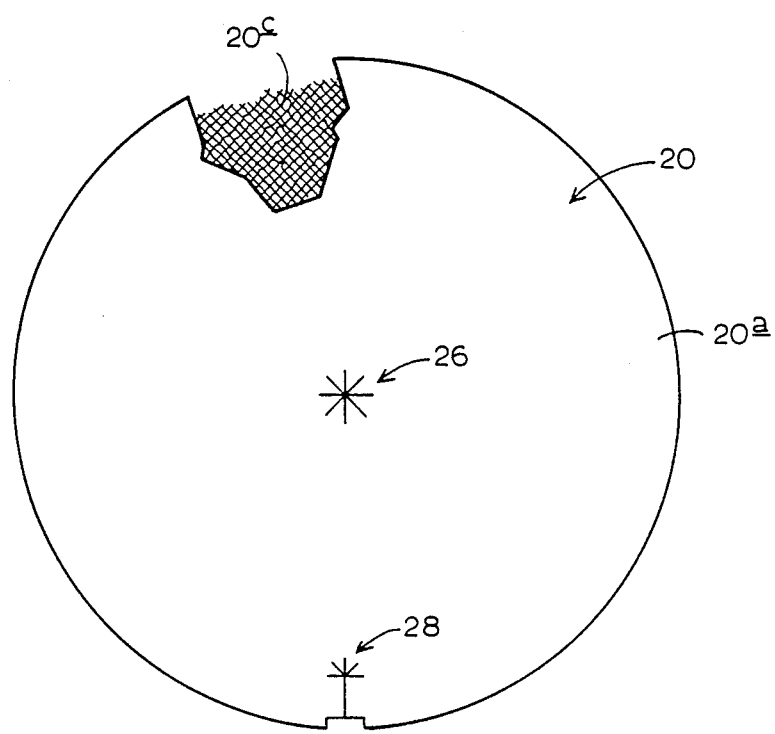
FIG. 3 illustrates the pre-assembly construction of one of the two rip-stop backed films employed in the wheel of FIG. 2.

FIG. 3 shows what might be thought of as the pre-assembly condition of structure 20. Here film 20a is preferably cut to an outer circular size which is slightly larger than the rim area to which it will ultimately be bonded. The film and backing are suitably incised, as shown at 26, 28, to allow securing of the structure to previously mentioned frames 20d, 20f (not shown). With these frames in place, the film and its backing are bonded by gluing to a side in the wheel rim, and heat is then suitably applied to shrink the structure, thus to produce a drum tight structural/aerodynamic member in the wheel, with a smooth, outer surface which defines, now, one of the axial sides in the wheel.

The important advantages offered by the structure just described should be immediately apparent. The materials chosen for construction of the drag-reducing structure are extremely inexpensive, and assembly with components in an otherwise conventional wheel, through simple bonding to the wheel's rim, offer surprisingly low-cost fabrication. In fact, experience has shown that the a wheel structure constructed in accordance with the present invention can cost even less than one-tenth of the cost of certain disk wheels today on the market.

With respect to weight, whereas conventional disk wheel structure typically weighs in the range of about 875-grams to about 1100-grams, the structure proposed herein weighs typically about 745-grams.

Accordingly, the structure proposed by the present invention offers all of the important advantages ascribed to it earlier herein. And, while a preferred embodiment has been described, it is appreciated that variations and modifications may be made without departing from the spirit of the invention.

I claim:
1. A low-aerodynamic-drag disk wheel for a vehicle such as a bicycle comprising
a central hub having a rotation axis,
an outer tire-carrying rim concentric with, and spaced radially from, said hub, and
aerodynamic drag-reducing structure interposed said hub and rim including, on each axial side of said wheel, a smooth-surfaced, smoothly stretched, thin, light-weight plastic film spanning the annular space between said hub and rim and bonded to the latter, said films forming the broad-expanse, opposite, outer, axial sides of the wheel.

2. The wheel of claim 1 which further includes, for each film, a thin, light-weight, rip-stop backing joined to the inside surface of the film.

3. The wheel of claims 1 or 2 which further includes spoke structure extending between and joining with said hub and rim, and wherein said films extend over the outer sides of said spoke structure.

4. The wheel of claims 1 or 2, wherein said films are formed of a heat-shrinkable material.

5. The wheel of claim 3, wherein said films are formed of a heat-shrinkable material.

6. An aerodynamic drag-reducing structure for incorporation with a wheel for a vehicle, such as a bicycle, where such a wheel includes the usual hub, tire-carrying rim, and joinder structure extending between and joined with the hub and rim, said drag-reducing structure comprising for each opposite axial side of such a wheel, a thin, light-weight plastic film sized to be joined through bonding to the wheel's rim, and to extend in the annular space between the hub and rim, in a condition overlying the joinder structure, to form a smooth outer surface over a broad-expanse axial side of the wheel.

7. The structure of claim 6 which further includes, for each film, a thin, light-weight, rip-stop backing joined to the inner surface of the film.

8. An aerodynamic drag-reducing structure for incorporation with a wheel for a vehicle, such as a bicycle, where such a wheel includes the usual hub, tire-carrying rim, and joinder structure extending between and joined with the hub and rim, said drag-reducing structure comprising for each opposite axial side of such a wheel, a thin, light-weight film sized to be joined to the wheel via bonding to the wheel's rim, and to extend in the annular space between the hub and rim, in a condition overlying the joinder structure, to form a smooth outer surface over a broad-expanse axial side of the wheel.

* * * * *